US011237599B2

(12) United States Patent
Ku et al.

(10) Patent No.: US 11,237,599 B2
(45) Date of Patent: Feb. 1, 2022

(54) DUAL-AXIS HINGE ASSEMBLY FOR ELECTRONIC DEVICES

(71) Applicant: HEWLETT-PACHKARD DEVELOPMENT COMPANY, L.P., Spring, TX (US)

(72) Inventors: Chung-Hua Ku, Taipei (TW); Wei-Chung Chen, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 164 days.

(21) Appl. No.: 16/639,623

(22) PCT Filed: Aug. 17, 2017

(86) PCT No.: PCT/US2017/047257
§ 371 (c)(1),
(2) Date: Feb. 17, 2020

(87) PCT Pub. No.: WO2019/035833
PCT Pub. Date: Feb. 21, 2019

(65) Prior Publication Data
US 2020/0241602 A1    Jul. 30, 2020

(51) Int. Cl.
*G06F 1/16*        (2006.01)
*E05D 11/08*     (2006.01)

(52) U.S. Cl.
CPC ............ *G06F 1/1681* (2013.01); *E05D 11/08* (2013.01); *G06F 1/1618* (2013.01); *E05Y 2900/606* (2013.01)

(58) Field of Classification Search
CPC combination set(s) only.
See application file for complete search history.

(56) References Cited

U.S. PATENT DOCUMENTS

| | | |
|---|---|---|
| 7,129,931 B2 | 10/2006 | Pappas |
| 7,299,523 B2 | 11/2007 | Zou |
| 7,652,877 B2 * | 1/2010 | Nishizawa ............ G06F 1/1683 361/679.27 |
| 7,667,959 B2 | 2/2010 | Pelkonen |
| 7,984,533 B2 | 7/2011 | Wei |
| 8,248,764 B2 | 8/2012 | Hassemer et al. |
| 8,938,856 B1 | 1/2015 | Shin et al. |
| 9,009,919 B1 | 4/2015 | Chiang |
| 10,725,505 B1 * | 7/2020 | Hallar ................... G06F 1/1683 |
| 10,824,205 B2 * | 11/2020 | Lin ........................ G06F 1/1681 |
| 10,852,776 B1 * | 12/2020 | Morrison ............. G06F 1/1616 |
| 10,928,864 B1 * | 2/2021 | Sanchez .............. E05D 11/1028 |

(Continued)

*Primary Examiner* — Lisa Lea-Edmonds
(74) *Attorney, Agent, or Firm* — Global IP Services PLLC

(57) ABSTRACT

In one example, a dual-axis hinge assembly for an electronic device is disclosed, which may include a casing defining a pair of slots and an elastic member disposed in the casing. The elastic member may include mounting features at opposite ends. The dual-axis hinge assembly may include a pair of shafts received through a respective one of the mounting features and the slots, and engaged with display housing and a main housing of the electronic device to pivotably connect the display housing to the man housing. The elastic member may enable at least one of the shafts to slide along the slots to variably adjust a distance between a pivot axis of the display housing and a pivot axis of the main housing.

15 Claims, 4 Drawing Sheets

(56) References Cited

U.S. PATENT DOCUMENTS

| | | | |
|---|---|---|---|
| 10,983,567 B1 * | 4/2021 | Files | G06F 3/017 |
| 10,983,570 B1 * | 4/2021 | Files | G06F 3/0208 |
| 10,990,204 B1 * | 4/2021 | Trim | G06F 3/0202 |
| 11,016,539 B2 * | 5/2021 | Hallar | G06F 1/1616 |
| 11,016,540 B2 * | 5/2021 | Hallar | G06F 1/1616 |
| 11,061,444 B2 * | 7/2021 | Nakamura | G06F 1/1618 |
| 11,093,008 B2 * | 8/2021 | Hallar | E05D 11/1028 |
| 11,099,611 B2 * | 8/2021 | Hallar | G06F 1/1616 |
| 2007/0127199 A1 | 6/2007 | Arneson | |
| 2012/0314399 A1 | 12/2012 | Bohn | |
| 2019/0301215 A1 * | 10/2019 | Siddiqui | G06F 1/1681 |
| 2020/0291702 A1 * | 9/2020 | Hsu | E05D 3/122 |

* cited by examiner

DUAL-AXIS HINGE ASSEMBLY FOR ELECTRONIC DEVICES

BACKGROUND

Electronic devices such as laptop computers, tablet computers, personal digital assistants (PDAs), flip mobile phones, and the like may include a main housing, a display housing, and a hinge assembly mounted between the main housing and the display housing. For example, the main housing may house a keyboard, a motherboard, and/or other components. The display housing may house a display. The hinge assembly may connect the display housing to the main housing and allow the display housing to rotate relative to the main housing.

BRIEF DESCRIPTION OF THE DRAWINGS

Examples are described in the following detailed description and in reference to the drawings, in which.

DETAILED DESCRIPTION

Hinged electronic devices, such as laptop computers, tablet computers, personal digital assistants (PDAs), and flip mobile phones, may include a main housing and a display housing connected by a hinge. The hinge can be a double-axis construction wherein two shafts are separately attached to the device parts and a coupling is engaged with the two shafts to allow the shafts to be used as two pivot axes. The main housing may house a keyboard and the display housing may house a display. In a closed position or 360° open position, the two pivot axes may be fixed and positioned even with the plane of contact between the main housing and the display housing. In such cases, the display housing, the display and/or a keyboard portion may be damaged when a user accidentally puts a stationery in-between the display housing and the main housing while closing the display housing or opening the display housing at 360°.

Examples described herein may provide a hinge assembly for an electronic device. The hinge assembly may include a casing defining a pair of include mounting features at opposite ends. Further, the hinge assembly may include a pair of shafts received through a respective one of the mounting features and the slots, and engaged with a display housing and a main housing of the electronic device to pivotably connect the display housing the main housing. The elastic member may enable at least one of the shafts to slide along the slots to variably adjust a distance between a pivot axis of the display housing and a pivot axis of the main housing. For example the elastic member may enable at least one of the shafts to slide along the slots when a force exerted during closure of the display housing is greater than a fixed force of the elastic member. Similarly, the elastic member may enable at least one of the shafts to slide along the slots when force exerted during opening of the display housing at 360° is greater than a fixed force of the elastic member.

Examples described herein may increase the distance between the pivot axis of the display housing and the pivot axis of the main housing to prevent any damage when the display housing is closed relative to the main housing with an object present in-between, thereby saving maintenance cost.

Figure 1A:
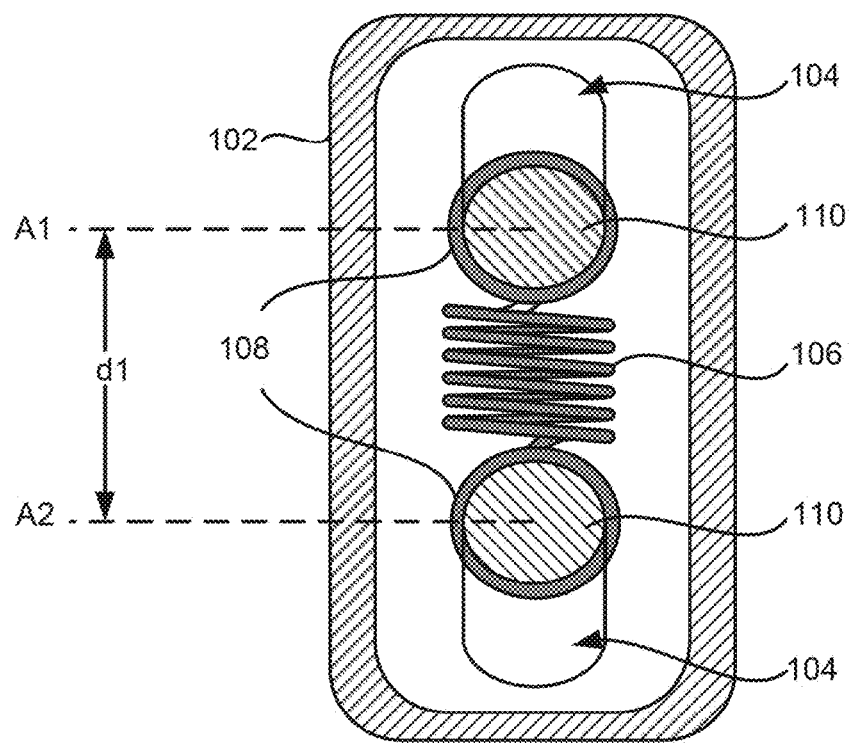
FIGS. 1A and 1B illustrate cross-sectional side views of an example hinge assembly.
Figure 1B:
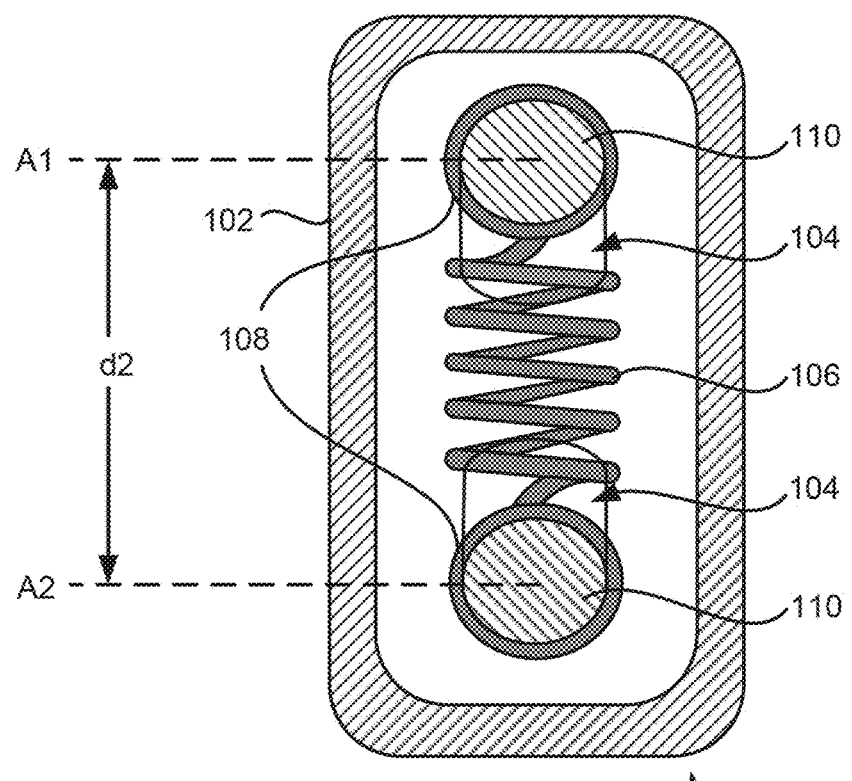

FIGS. 1A and 1B illustrate cross-sectional side views of an example hinge assembly 100. Particularly, FIG. 1A illustrates a cross-sectional side view of example hinge assembly 100, depicting a lock position of shafts 110 at respective inmost ends of slots 104, FIG. 1B illustrates a cross-sectional side view of example hinge assembly 100, depicting sliding movement of shafts 110 to respective outmost ends of slots 104. Example, hinge assembly 100 may be a dual-axis hinge assembly.

Hinge assembly 100 may include a casing 102 defining a pair of slots 104. In one example, casing 102 may be formed using a single-piece structure. In another example, casing 102 may be formed by a hinge cap and a pair of hinge brackets connected to the hinge cap at both sides such that slots 104 may be defined in at least one of the hinge brackets. An example casing 102 is explained in FIG. 3B.

Further, hinge assembly 100 may include an elastic member 106 disposed in casing 102. Elastic member 106 may include mounting features 108 at opposite ends. In one example, casing 102 may define a portion therein for receiving elastic member 106. Example elastic member 106 may be a spring.

Hinge assembly 100 may include a pair of shafts 110 received through a respective one of mounting features 108 and slots 104, and engaged with a display housing and a main housing of an electronic device to pivotably connect the display housing to the main housing. In one example, one end of each shaft 110 may protrude out of a respective slot 104 (e.g., on one side of casing 102) and fixedly engage with a corresponding one of the display housing and the main housing while other end of each shaft 110 may engage with an opposite side of casing 102.

Elastic member 106 may enable at least one of shafts 110 to slide along slots 104 to variably adjust a distance between a pivot axis (A1) of display housing and a pivot axis (A2) of the main housing. In one example, elastic member 106 may lock a position of pair of shafts 110 at respective inmost ends of slots 104 when the display housing is closed or opened at 360° relative to the main housing with no object disposed in-between (e.g., as shown in FIG. 1A). In this example, the distance between A1 and A2 may be d1. In another example, elastic member 106 may enable at least one shaft 110 to slide along a corresponding slot 104 to respective outmost ends when the display housing is closed or opened at 360° relative to the main housing with an object in-between (e.g., as shown in FIG. 1B). In this example, the distance between A1 and A2 may be d2, where d2>d1.

Figure 2A:
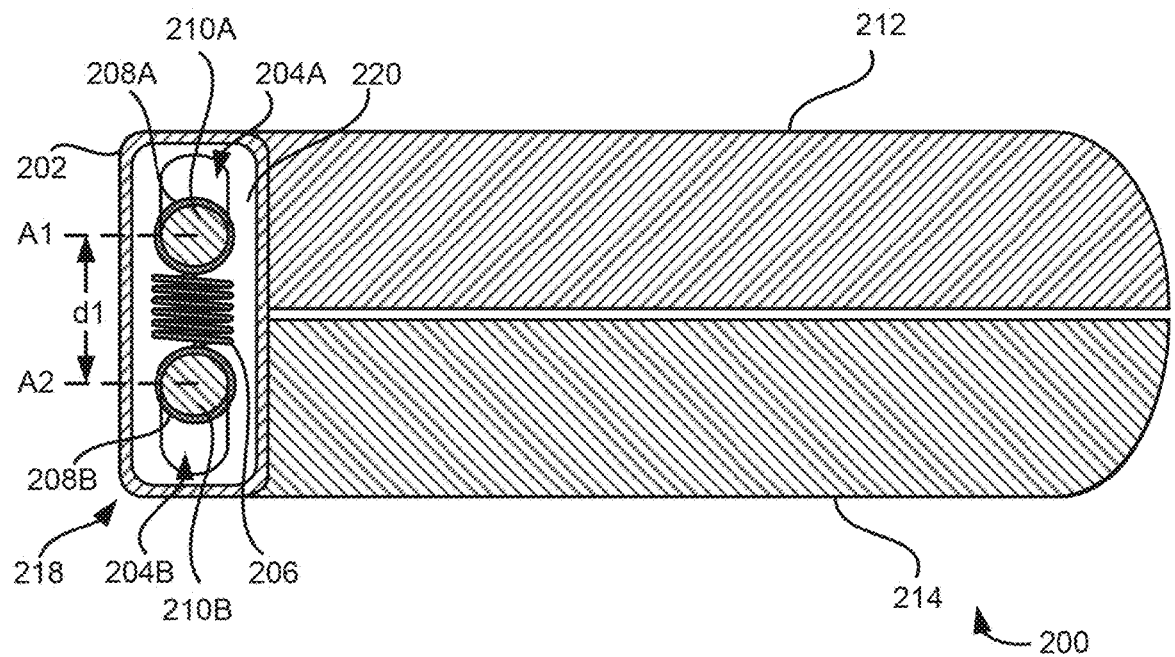
FIGS. 2A and 2B illustrate cross-sectional side views of an example electronic device, depicting variably adjusting a distance between a pivot axis of a display housing and a pivot axis of a main housing.
Figure 2B:
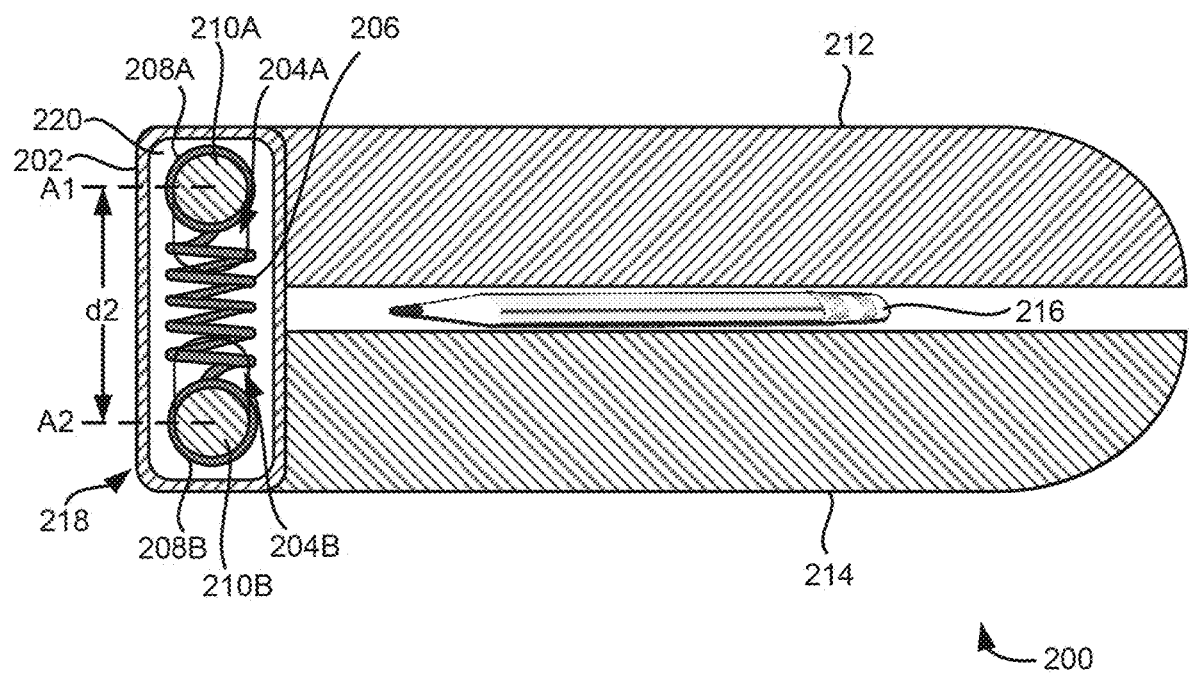

FIGS. 2A and 2B illustrate cross-sectional side views of an example electronic device 200, depicting variably adjusting a distance between a pivot axis of a display housing 212 and a pivot axis of a main housing 214. Main housing 214 may be connected to display housing 212 by a hinge assembly 218.

Hinge assembly 218 may include a casing 202 defining a first slot 204A and a second slot 204B in at least one side wall 220 (e.g., a hinge bracket). Hinge assembly 218 may include an elastic member 206 received in casing 202. Elastic member 206 may include at least one first mounting feature 208A and at least one second mounting feature 208B at opposite ends.

Hinge assembly 218 may include a first shaft 210A received through first mounting feature 208A and first slot 204A, and fixedly engaged with display housing 212. Hinge assembly 218 may include a second shaft 210B received through second mounting feature 208B and second slot 204B and fixedly engaged with main housing 214.

During operation, elastic member 206 may enable first shaft 210A and second shaft 210B to slide along first slot 204A and second slot 204B, respectively, to variably adjust a distance between a pivot axis (A1) of display housing 212 and a pivot axis (A2) of main housing 214 when a force exerted during closure of display housing 212 is greater than a fixed force of elastic member 206. In this example, first shaft 210A and second shaft 210B may slide along first slot 204A and second slot 204B by stretching elastic member 206 when the force exerted on display housing 212 is greater than the fixed force of elastic member 206.

For example, a display of display housing 212 may abut against keyboard in main housing 214 when the display is closed relative to main housing 214. As shown in FIG. 2A, a distance between pivot axis A1 and pivot axis A2 is d1, when display housing 212 is closed relative to main housing 214 with no object disposed in-between.

As shown in FIG. 2B, elastic member 206 may enable first shaft 210A and second shaft 210B to slide along first slot 204A and second slot 204B to increase the distance (i.e., d2, where d2>d1) between pivot axis A1 and pivot axis A2 when display housing 212 is closed relative to main housing 214 with an object 216 (e.g., a pen, pencil, data card, and the like) in-between. In this example, when display housing 212 physically touches/contacts the object during closure of display housing 212 and when the force exerted during closure of display housing 212 is greater than the fixed force of elastic member 206, then elastic member 206 may be stretched to increase the distance between pivot axis A1 and pivot axis A2.

Similarly, elastic member 206 may enable first shaft 210A and second shaft 210B to slide along first slot 204A and second slot 204B to increase the distance between pivot axis A1 and pivot axis A2 when display housing 212 is opened 360° relative to main housing 214 with object 216 in-between. When the closing force on display housing 212 is released (i.e., force exerted is less than the fixed force of elastic member 206), then elastic member 206 may be returned to a relaxed state, thereby bringing the distance between pivot axis A1 and pivot axis A2 to a normal state, i.e., d1.

In one example, a diameter of first shaft 210A and second shaft 210B can be less than a length of first slot 204A and second slot 204B, respectively, to enable sliding movement of first shaft 210A and second shaft 210B. Further, first shaft 210A may include a first bracket to fixedly secure first shaft 210A to display housing 212 and second shaft 210B may include a second bracket to fixedly secure second shaft 210B to main housing 214. An example electronic device is explained in FIGS. 3A-3C.

Figure 3A:
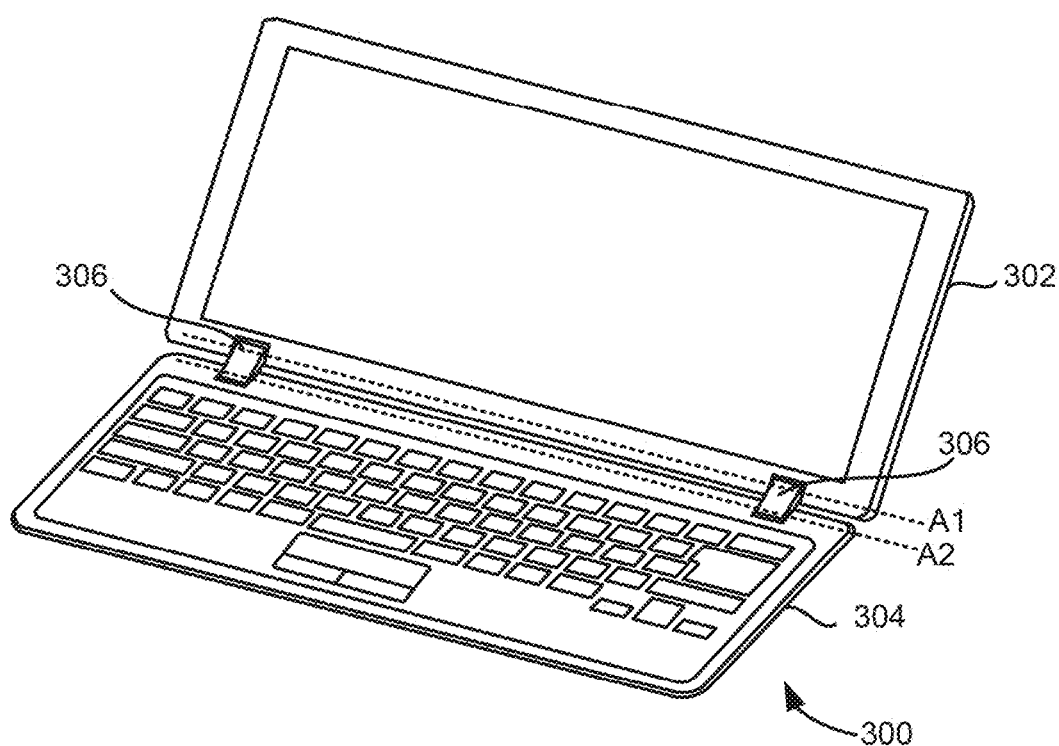
FIG. 3A is a perspective view of the example electronic device including an example hinge assembly to variably adjust a distance between a pivot axis of a display housing and a pivot axis of a main housing.

FIG. 3A is a perspective view of an example electronic device 300 including a hinge assembly 306 to variably adjust a distance between a pivot axis of a first housing 302 (e.g., a display housing) and a pivot axis of a second housing 304 (e.g., a main housing). Electronic device 300 may include second housing 304 and first housing 302 connected to second housing 304 via hinge assembly 306. Example electronic device 300 may be a computing system, for example, a laptop, a convertible device, a PDA, a notebook, a sub-notebook, a mobile telephone, a personal gaming device, or other computing device with first housing 302 closeable onto second housing 304. Example convertible device may refer to a device that can be "converted" from a laptop mode to a tablet mode. In the tablet mode, first housing 302 may be closed with a display facing up and viewable, i.e., first housing 302 may be substantially parallel to and adjacent to second housing 304.

For example, second housing 304 may house a keyboard, a battery, a touchpad, and so on. First housing 302 may house a display (e.g., touch-screen display). Example display may include liquid crystal display (LCD), light emitting diode (LED), electro-luminescent (EL) display, or the like. Electronic device 300 may be equipped with other components such as a camera, audio/video devices, and the like, depending on the functions of electronic device 300. Hinge assembly 306 may be pivotally connected to first housing 302 along a first pivot axis (A1) and second housing 304 along a second pivot axis (A2). Hinge assembly 306 may allow first housing 302 to rotate in directions about rotational axis relative to second housing 304, for instance, between 0° to 360°.

Figure 3B:
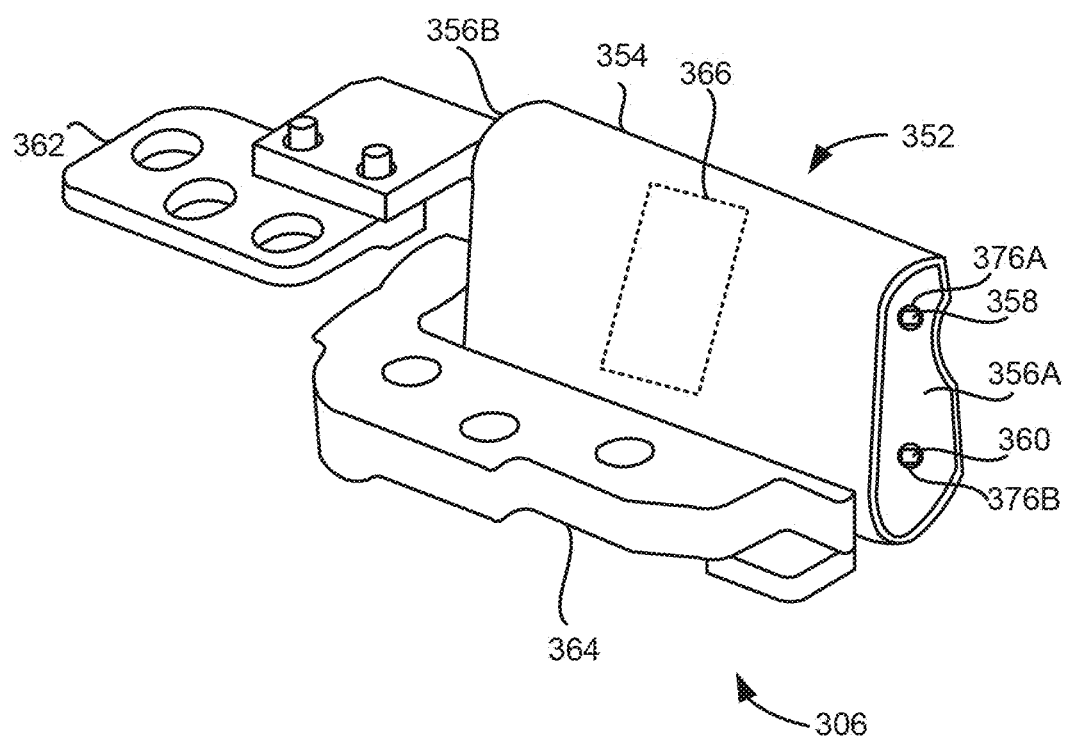
FIG. 3B is a schematic view of the example hinge assembly of FIG. 3A.
Figure 3C:
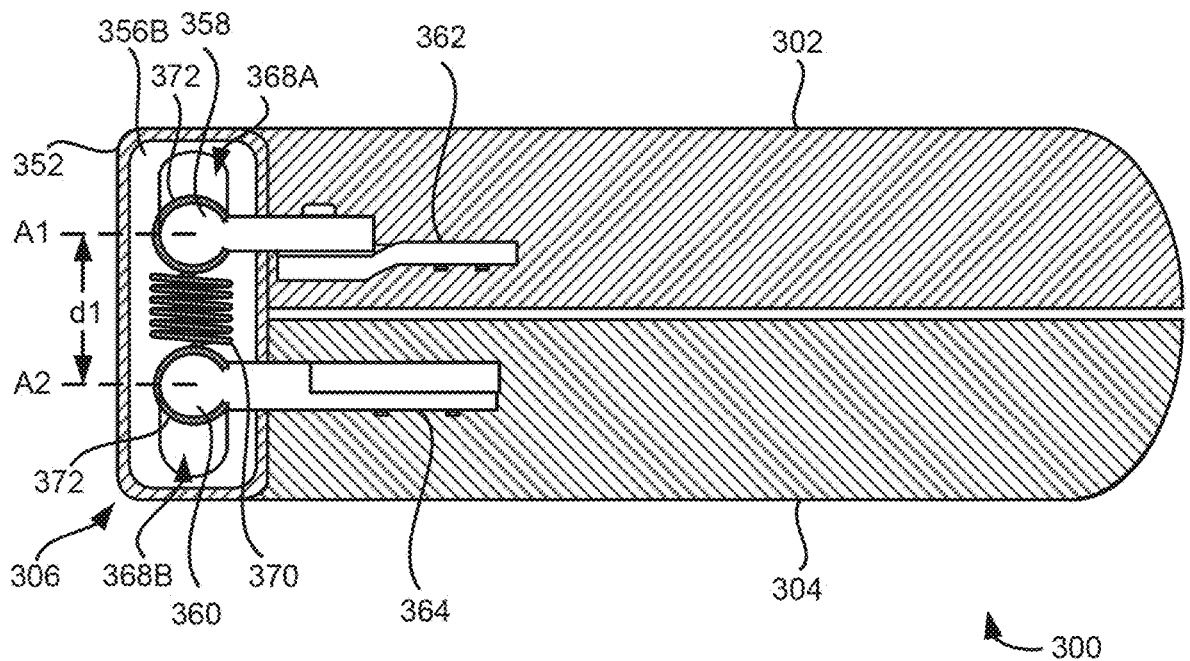
FIGS. 3C and 3D illustrate cross-sectional side views of the example electronic device of FIG. 3A in a closed position, showing additional features.

FIG. 3B is a schematic view of example hinge assembly 306 of FIG. 3A. Hinge assembly 306 may include a casing 352 defining a pair of slots (e.g., slots 368A and 368B as shown in FIG. 3C) in a hinge bracket 356B. In one example, casing may be formed by a hinge cap 354 and a pair of hinge brackets 356A and 356B connected to hinge cap 354 at both sides such that slots 368A and 368B are defined in hinge bracket 356B.

Hinge assembly 306 may include an elastic member (e.g., elastic member 370 as shown in FIG. 3C) received in casing 352 and includes mounting features 372 at opposite ends. Hinge assembly 306 may include a pair of shafts 358 and 360 received through a respective one of mounting features 372 and the slots 368A and 368B, and engaged with first housing 302 along first pivot axis A1 and second housing 304 along second pivot axis A2.

Further, shafts 358 and 360 may include a first bracket 362 and a second bracket 364 to fixedly engage shafts 358 and 360 to first housing 302 and the second housing 304, respectively, such that first housing 302 can be moved relative to second housing 304 in response to rotation of first housing 302 about hinge assembly 306. Hinge assembly 306 may include at least one torque engine 366 connected to shafts 358 and 360 to provide friction resistance between first housing 302 and second housing 304 during pivoting motion. In one example, elastic member 370 can be designed as a part of torque engine 366 such that shafts 358 and 360 can slide along slots 368A and 368B to vary a distance between first pivot axis A1 and second pivot axis A2.

Figure 3D:
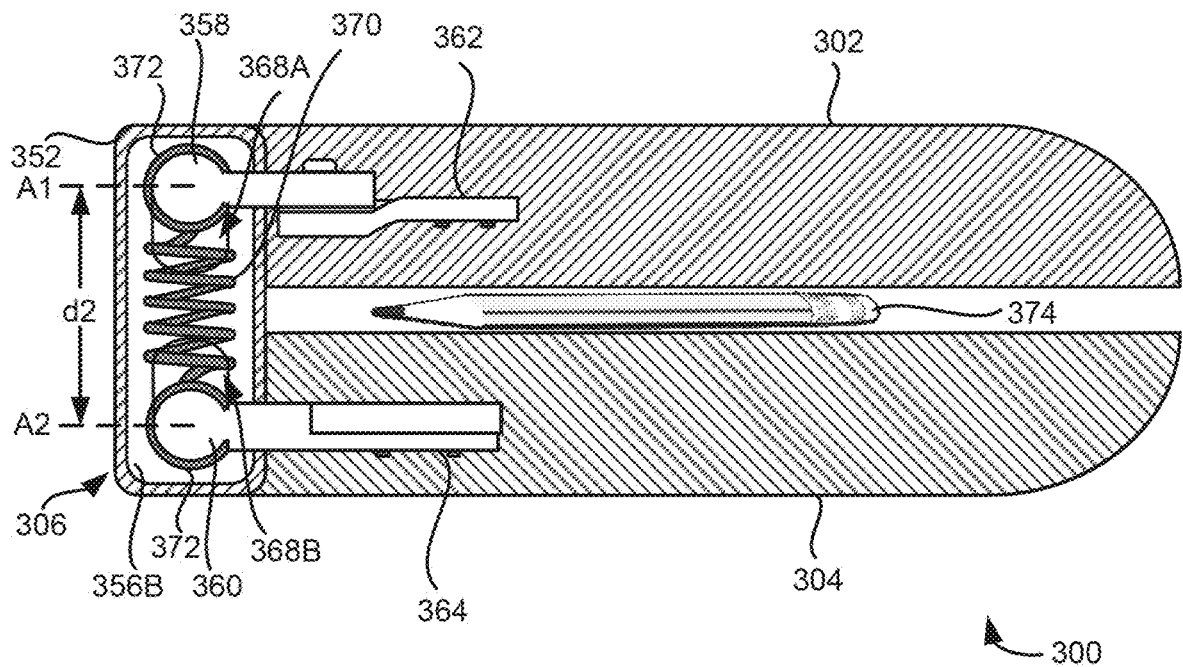

FIGS. 3C and 3D illustrate cross-sectional side views of an example electronic device 300 in a closed position, showing additional features. As shown in FIGS. 3C and 3D, an end of a first shaft 358 may protrude out of casing 352 through first slot 368A and fixedly couple with display housing 302 via first bracket 362, for instance, using screws. Further as shown in FIGS. 3C and 3D, an end of second shaft 360 may protrude out of casing 352 through second slot 368B and fixedly couple with main housing 304 via second bracket 364, for instance, using screws. Other end of shafts 358 and 360 may engage with hinge bracket 356A of casing 352. For example, as shown in FIG. 3B, hinge bracket 356A may include a pair of openings 376A and 376B to accommodate/hold other end of shafts 358 and 360, respectively.

In one example, elastic member 370 may lock a position of shafts 358 and 360 at respective inmost ends of slots 368A and 368B when first housing 302 is closed relative to second housing 304 with no object disposed in-between (e.g., as shown in FIG. 3C). In another example, elastic member 370 may enable shafts 358 and 360 to slide along slots 368A and 368B to variably adjust a distance between first pivot axis A1 and second pivot axis A2. Elastic member 370 may enable shafts 358 and 360 to slide along slots 368A and 368B to increase the distance between first pivot axis A1 and second pivot axis A2 when first housing 302 is closed relative to second housing 304 with an object 374 disposed in-between.

In this example, shafts 358 and 360 may slide along the slots 368A and 368B, respectively, to increase the distance between first pivot axis A1 and second pivot axis A2 when display side of first housing 302 touches the object 374 during closure of first housing 302 and force exerted during closure of first housing 302 is greater than a fixed force of elastic member 370. Examples described herein can also be used in other hinge structures provided that the distance between first pivot axis A1 and second pivot axis A2 can be adjusted via a spring when first housing 302 is closed or opened at 360° relative to second housing 304 with an object in-between.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A dual-axis hinge assembly for an electronic device, comprising:
    a casing defining a pair of slots;
    an elastic member disposed in the casing, wherein the elastic member comprises mounting features at opposite ends, and
    a pair of shafts received through a respective one of the mounting features and the slots, and engaged with a display housing and a main housing of the electronic device to pivotably connect the display housing to the main housing, and wherein the elastic member is to enable at least one of the shafts to slide along the slots to variably adjust a distance between a pivot axis of the display housing and a pivot axis of the main housing.

2. The dual-axis hinge assembly of claim 1, wherein the casing defines a portion therein for receiving the elastic member, and wherein the elastic member is a spring.

3. The dual-axis hinge assembly of claim 1, wherein the casing is formed by a hinge cap and a pair of hinge brackets connected to the hinge cap at both sides such that the slots are defined in at least one of the hinge brackets.

4. The dual-axis hinge assembly of claim 1, wherein the elastic member is to lock a position of the pair of shafts at respective inmost ends of the slots when the display housing is closed or opened at 360° relative to the main housing with no object disposed in-between.

5. The dual-axis hinge assembly of claim 1, wherein the elastic member is to enable the at least one of the shafts to slide along the slots to respective outmost ends when the display housing is closed or opened at 360° relative to the main housing with an object in-between.

6. The dual-axis hinge assembly of claim 1, wherein at least one end of the pair of shafts is fixedly engaged with a corresponding one of the display housing and the main housing.

7. A hinge assembly for an electronic device, comprising:
    a casing defining first and second slots in at least one side wall;
    an elastic member received in the casing, wherein the elastic member comprises first and second mounting features at opposite ends;
    a first shaft received through the first mounting feature and the first slot, and fixedly engaged with a display housing; and
    a second shaft received through toe second mounting feature and the second slot, and fixedly engaged with a main housing, wherein the elastic member is to enable the first and second shafts to slide along the first and second slots to variably adjust a distance between a pivot axis of the display housing and a pivot axis of the main housing when a force exerted during closure of the display housing is greater than a fixed force of the elastic member.

8. The hinge assembly of claim 7, wherein the elastic member is to enable the first shaft and the second shaft to slide along the first slot and the second slot, respectively, to increase the distance between the pivot axis of the display housing and the pivot axis of the main housing when the display housing is closed relative to the main housing with an object in-between.

9. The hinge assembly of claim 7, wherein an end of the first shaft protrudes out of the casing through the first slot and fixedly couples with the display housing via a first bracket, and wherein an end of the second shaft protrudes out of the casing through the second slot and fixedly couples with the main housing via a second bracket.

10. The hinge assembly of claim 7, wherein a diameter of the first shaft and the second shaft is less than a length of the first slot and the second slot, respectively, to enable sliding movement of the first shaft and the second shaft.

11. An electronic device, comprising:
    a first housing;
    a second housing, and
    a hinge assembly pivotally connected to the first housing along a first pivot axis and the second housing along a second pivot axis, wherein the hinge assembly comprises:
        a casing defining a pair of slots;

an elastic member received in the casing and includes mounting features at opposite ends; and a pair of shafts received through a respective one of the mounting features and the slots, and engaged with the first housing along the first pivot axis and the second housing along the second pivot axis, and wherein the elastic member is to enable at least one of the shafts to slide along the slots to variably adjust a distance between the first pivot axis and the second pivot axis.

12. The electronic device of claim 11, wherein the hinge assembly comprises at least one torque engine connected to the shafts to provide friction resistance between the first housing and the second housing during pivoting motion.

13. The electronic device of claim 11, wherein the casing is formed by a hinge cap and a pair of hinge brackets connected to the hinge cap at both sides such that the slots are defined in at least one of the hinge brackets.

14. The electronic device of claim 11, wherein the pair of shafts comprises a first shaft and a second shaft, wherein the first shaft comprises a first bracket to fixedly engage the first shaft to the first housing and the second shaft comprises a second bracket to fixedly engage the second shaft to the second housing.

15. The electronic device of claim 11, wherein the elastic member is to enable the pair of shafts to slide along the slots to increase the distance between the first pivot axis and the second pivot axis when the first housing is closed or opened at 360° relative to the second housing with an object disposed in-between.

\* \* \* \* \*